W. H. SCHALL.
Nut-Lock.
No. 205,306. Patented June 25, 1878.
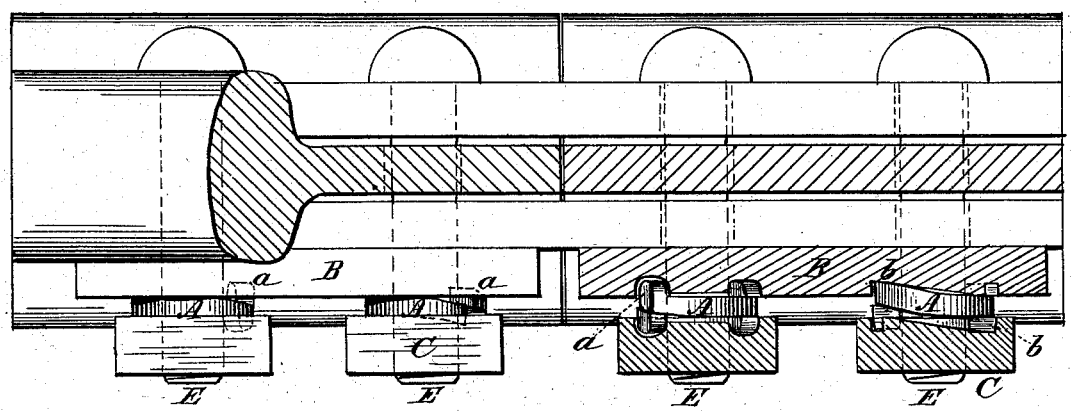
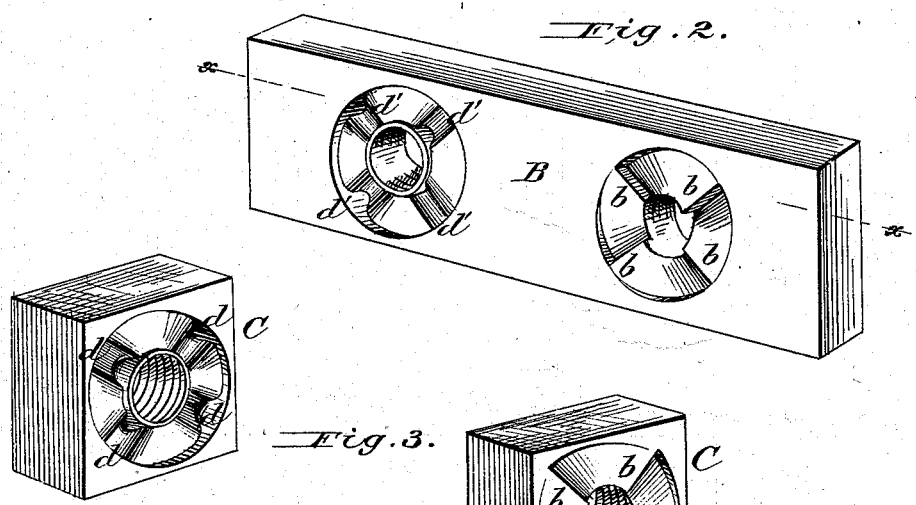
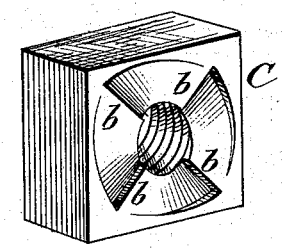
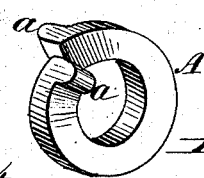
Attest:
H. L. Perrine
Floyd Norris
Inventor
William H. Schall
By Johnson & Johnson
Atty's.

UNITED STATES PATENT OFFICE.

WILLIAM H. SCHALL, OF LATROBE, PA., ASSIGNOR OF ONE-HALF HIS RIGHT TO LOUIS WEBER AND JOSEPH SMITH, OF SAME PLACE.

IMPROVEMENT IN NUT-LOCKS.

Specification forming part of Letters Patent No. 205,306, dated June 25, 1878; application filed May 24, 1878.

*To all whom it may concern:*

Be it known that I, WILLIAM H. SCHALL, of Latrobe, in the county of Westmoreland and State of Pennsylvania, have invented certain new and useful Improvements in Nut-Locks; and I do hereby declare that the following is a full, clear, and exact description thereof, which will enable others skilled in the art to which it appertains to make and use the same, reference being had to the accompanying drawings, and to letters of reference marked thereon, which form a part of this specification.

The invention relates to spring-washers employed for locking nuts of railway-joints and for other purposes.

I am aware that hitherto stout helical springs or helical sections of springs have been used, and that their ends have been made to project beyond the true helical plane to form biting-edges; but in practice such devices do not perform their intended function of preventing the nut from slipping, as the projecting edges will not embed themselves in the nut and the surface against which the washer rests.

I am aware, also, that it has been attempted to remedy these defects by providing various gripes or stops on the inner face of the nut and on the lock-bar or other surface; but these have generally been of constructions which rendered their use undesirable in an economic view.

For my nut-lock, I form upon the inner face of the nut, and upon the lock-plate or other surface, a series of substantially deep depressions, for the purpose of receiving bulbous end projections of a helical spring-washer, whereby the projecting bulbs cannot by any force or jar be made to slip, but have positive abutting matching locks, and yet of such a nature (as will be presently described) as to admit of the nut being removed by a wrench when necessary.

In the accompanying drawings, Figure 1 represents a top view embracing my improvements, showing, in section, the relations of the nut, washer, and lock plate or bar with a rail-joint; Fig. 2, a perspective of the lock plate or bar, showing two forms of indentation adapted for the bulb-lock; Fig. 3, perspectives of the locking sides of two nuts, with corresponding indentations to Fig. 2; and Fig. 4, a view of the helical spring-washer with projecting end bulbs.

The spring-washer A is of helical form, with bulbous projections $a$ formed upon its ends, as shown in Fig. 4. These bulbs $a$ engage with concave depressions $d$ upon the inner face of the nut C and similar concave depressions $d'$ on the lock plate or bar B, whereby, when the nut is screwed home, the bulbs of the washer will be held, and thus prevent the nut from turning, since one bulb-projection has a positive lock with the nut and the other with the lock-bar.

In lieu of the concave indentations $d\ d'$ above described, I have shown and may use a series of ratchet-inclines, $b\ b$, in which case the bulb-projection would be held safe against any jar; but the nut might yet be removed with a wrench. I prefer, however, to use the concave indentations.

The helical washer is placed on the bolt E the reverse of the bolt-thread, whereby to permit the screwing home of the nut, and yet prevent its withdrawal in connection with the indentations and bulbous ends.

By reason of the convex form of the projecting ends $a$, they are rendered capable of riding out of and over the concave depressions or ratchet-inclines when the wrench is applied, and still withstand the ordinary or usual jar. This form also allows the washer to exercise its intended resilient function, whereas in other forms when the nut is driven home the washer is so flattened that its spring function ceases.

With my washer there is always room left when it is applied for sufficient play to prevent the stripping of the bolt-threads.

I claim—

The helical spring-washer formed with bulbs or convex end projections $a$, in combination with concave depressions $d\ d'$, or their equivalent, on the nut and on the lock-bar, and the bolt, substantially as described.

In testimony that I claim the foregoing I have affixed my signature in presence of two witnesses.

WILLIAM H. SCHALL.

Witnesses:
WILLIAM HOKE,
LOUIS WEBER.